US006716925B2

(12) United States Patent
Thielen et al.

(10) Patent No.: US 6,716,925 B2
(45) Date of Patent: Apr. 6, 2004

(54) TIRE WITH A COMPONENT MADE OF A RUBBER COMPOSITION COMPRISED OF A RUBBER HAVING PENDANT HYDROXYL GROUPS AND A RUBBER CONTAINING A NITRILE MOIETY

(75) Inventors: Georges Marcel Victor Thielen, Schouweiler (LU); Stephan Franz Westermann, Trier (DE); Claude Charles Jacoby, Wasserbillig (LU); Christian Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 30 days.

(21) Appl. No.: 10/263,986

(22) Filed: Oct. 3, 2002

(65) Prior Publication Data

US 2003/0125468 A1 Jul. 3, 2003

Related U.S. Application Data

(60) Provisional application No. 60/335,932, filed on Nov. 2, 2001.

(51) Int. Cl.[7] .............................. C08L 19/00; C08L 9/06; C08L 33/02; C08L 33/04; B60C 1/00
(52) U.S. Cl. .................. 525/218; 525/221; 525/222; 525/232; 525/241
(58) Field of Search ................................ 525/218, 221, 525/222, 232, 241

(56) References Cited

U.S. PATENT DOCUMENTS

| | | |
|---|---|---|
| 4,150,014 A | 4/1979 | Edwards |
| 4,150,015 A | 4/1979 | Edwards et al. |
| 4,152,308 A | 5/1979 | Edwards et al. |
| 4,357,432 A | 11/1982 | Edwards ...................... 523/351 |
| 5,178,702 A | 1/1993 | Frerking, Jr. et al. ........ 152/510 |
| 5,310,815 A | 5/1994 | Senyek et al. ........... 524/329.3 |
| 5,639,528 A | 6/1997 | Feit et al. ................ 428/36.91 |
| 5,902,852 A | 5/1999 | Schulz et al. ............... 524/821 |
| 6,057,937 A | 5/2000 | Shimizu et al. ............. 358/302 |
| 6,562,908 B2 * | 5/2003 | Zen et al. .................... 525/191 |

* cited by examiner

*Primary Examiner*—Nathan M. Nutter
(74) *Attorney, Agent, or Firm*—John D. DeLong; Bruce J. Hendricks

(57) ABSTRACT

A tire with a rubber containing component compound of, based on 100 parts by weight (phr) of rubber, (A) from 10 to 90 phr of a terpolymer rubber having pendant hydroxyl groups; and
(B) from 10 to 90 phr of a rubber containing a nitrile moiety.

20 Claims, No Drawings

TIRE WITH A COMPONENT MADE OF A RUBBER COMPOSITION COMPRISED OF A RUBBER HAVING PENDANT HYDROXYL GROUPS AND A RUBBER CONTAINING A NITRILE MOIETY

The Applicants hereby incorporate by reference prior U.S. Provisional Application Ser. No. 60/335,932, filed on Nov. 2, 2001.

FIELD OF THE INVENTION

This invention relates to a tire having at least one component of a rubber composition comprised of two distinctly different rubbers. The first rubber is a terpolymer rubber which contains pendant hydroxyl groups and is derived from a diene hydrocarbon, vinyl aromatic compound monomers and a hydroxyl containing a co-monomer. The second rubber contains a nitrile moiety.

BACKGROUND OF THE INVENTION

Vehicular tires, particularly pneumatic tires, are sometimes provided with a component such as, for example, a tread which is comprised of a rubber composition which contains two or more rubbers or elastomers.

Elastomer blends which contain, for example, cis 1,4-polybutadiene and styrene/butadiene elastomers are often used for such tire component (e.g. tire tread). Rubber compositions may also contain various amounts of additional diene-based elastomers such as, for example, one or more of cis 1,4-polyisoprene, cis 1,4-polybutadiene, medium vinyl polybutadiene, styrene/butadiene copolymers, isoprene/butadiene copolymers, and minor amounts of 3,4-polyisoprene.

For the above mentioned styrene/butadiene copolymer rubber, both emulsion polymerization prepared and organic solvent polymerization prepared styrene/butadiene copolymer elastomers have been used. Also, historically, emulsion polymerization derived terpolymer elastomers comprised of units derived from styrene and 1,3-butadiene together with an additional monomer have been prepared and proposed for use for various products.

U.S. Pat. No. 5,902,852 discloses the modification of an asphalt cement with a rubbery terpolymer prepared by emulsion polymerization which is comprised of repeat units derived from conjugated diolefin monomer, such as, for example, cis 1,4-polybutadiene, vinyl aromatic monomer such as styrene and a small amount of hydroxypropyl methacrylate (HPMA).

U.S. Pat. No. 6,057,937 discloses use of a terpolymer of cis 1,4-polybutadiene, styrene and, for example hydroxypropyl methacrylate in rubber compositions.

Hydroxy-containing polymers are disclosed in U.S. Pat. Nos. 4,150,014, 4,150,015, 4,152,308 and 4,357,432.

SUMMARY AND PRACTICE OF THE INVENTION

The present invention relates to a rubber composition which is particularly suited for use in a tire. The composition is characterized by containing two very dissimilar rubbers. The first rubber is a terpolymer having a pendant hydroxyl group. The second rubber contains a nitrile moiety.

DETAILED DESCRIPTION OF THE INVENTION

There is disclosed a rubber composition comprising, based on 100 parts by weight (phr) of rubber (A) from 10 to 90 phr of a terpolymer rubber comprised of repeat units derived from
  (1) 30 to 89 weight percent of a conjugated diene monomer which contains from 4 to 8 carbon atoms;
  (2) 10 to 50 weight percent of a vinyl substituted aromatic monomer; and
  (3) 1 to 20 weight percent of at least one co-monomer selected from the group consisting of the following general formulas I, II, and III:

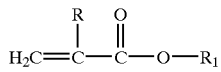

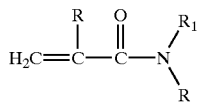

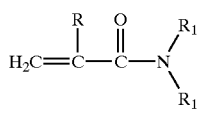

wherein R represents a hydrogen atom or an alkyl group containing from 1 to 8 carbon atoms;

wherein $R_1$ represents a saturated alcohol group containing from 1 to 8 carbon atoms;

(B) 10 to 90 phr of a rubber comprised of repeat units derived from
  (1) 30 to 99 weight percent of a conjugated diene monomer which contains from 4 to 8 carbon atoms;
  (2) zero to 50 weight percent of a vinyl substituted aromatic monomer; and
  (3) 1 to 20 weight percent of an olefinic unsaturated nitrile selected from the group consisting of acrylonitrile, methacrylonitrile, ethacrylonitrile, crotononitrile and mixtures thereof.

In addition, there is disclosed a tire having a component comprising, based on 100 parts by weight (phr) of rubber (A) from 10 to 90 phr of a terpolymer rubber comprised of repeat units derived from
  (1) 30 to 89 weight percent of a conjugated diene monomer which contains from 4 to 8 carbon atoms;
  (2) 10 to 50 weight percent of a vinyl substituted aromatic monomer; and
  (3) 1 to 20 weight percent of at least one co-monomer selected from the group consisting of the following general formulas I, II, and III:

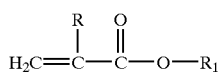

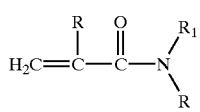

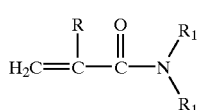

wherein R represents a hydrogen atom or an alkyl group containing from 1 to 8 carbon atoms;

wherein $R_1$ represents a saturated alcohol group containing from 1 to 8 carbon atoms;

(B) from 10 to 90 phr of a rubber comprised of repeat units derived from
  (1) 30 to 99 weight percent of a conjugated diene monomer which contains from 4 to 8 carbon atoms;
  (2) zero to 50 weight percent of a vinyl substituted aromatic monomer; and
  (3) 1 to 20 weight percent of an olefinic unsaturated nitrile selected from the group consisting of acrylonitrile, methacrylonitrile, ethacrylonitrile, crotononitrile and mixtures thereof.

In the description of this invention, the terms "rubber" and "elastomer" when used herein, are used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer".

The Tg of an elastomer, if referred to herein, refers to a "glass transition temperature" of the elastomer which can conveniently be determined by a differential scanning calorimeter at a heating rate of 10° C. per minute.

The first critical ingredient in the rubber composition is the terpolymer rubber derived from the conjugated diene monomer, vinyl substituted aromatic monomer and hydroxyl containing co-monomer. The terpolymer will comprise from 10 to 90 phr of the total 100 parts by weight of rubber in the composition. Preferably, from 25 to 75 phr will be the terpolymer.

Representative examples of conjugated diene monomers which may be used include 1,3-butadiene, isoprene, 1,3-ethylbutadiene, 1,3-pentadiene, 1,3-hexadiene, 1,3-cyclooctadiene, 1,3-octadiene and mixtures thereof. Preferably, the conjugated diene is 1,3-butadiene. The terpolymer will contain repeat units derived from 30 to 89 weight percent of the conjugated diene. Preferably, from 50 to 80 weight percent of the terpolymer will be derived from the conjugated diene.

The terpolymer is also derived from a vinyl substituted aromatic monomer. The vinyl-substituted aromatic compound may contain from 8 to 16 carbon atoms. Representative examples of vinyl substituted aromatic monomers are styrene, alpha methyl styrene, vinyl toluene, 3-methyl styrene, 4-methyl styrene, 4-cyclohexylstyrene, 4-paratolylstyrene, para-chlorostyrene, 4-tert-butyl styrene, 1-vinylnaphthalene, 2-vinylnaphthalene and mixtures thereof. Preferably, styrene is used. The terpolymer will contain repeat units derived from 10 to 50 weight percent of the vinyl substituted aromatic monomer. Preferably, from 20 to 40 weight percent of the terpolymer is derived from a vinyl substituted aromatic monomer.

The terpolymer is also derived from a hydroxyl containing monomer. One to 20 weight percent of the terpolymer is derived from the hydroxy containing monomers. Preferably, from 1 to 5 weight percent of the terpolymer is derived from these monomers. The hydroxyl containing co-monomer may be a hydroxyl alkyl acrylate of formula I or a hydroxy alkyl acrylamide of formula II and/or III, as seen below.

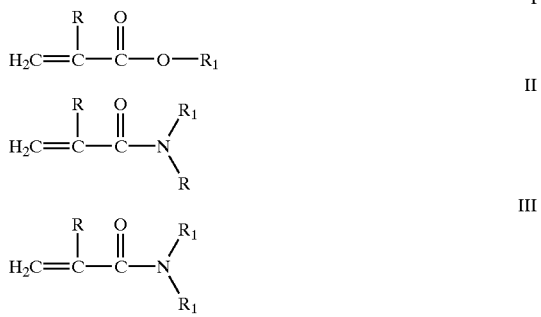

wherein R represents a hydrogen atom or an alkyl group containing from 1 to 8 carbon atoms. Preferably, R is a hydrogen atom or an alkyl group having from 1 to 4 carbon atoms. $R_1$ is a saturated alcohol group containing from 1 to 8 carbon atoms. Preferably, $R_1$ has from 1 to 4 carbon atoms. The saturated alcohol group may be a primary, secondary or tertiary alcohol group.

The hydroxy alkyl acrylate co-monomer of structural formula I may be hydroxymethyl methacrylate, 2-hydroxyethyl methacrylate, 2-hydroxypropyl methacrylate (HPMA isomer), 3-hydroxypropyl methacrylate (HPMA isomer), 3-phenoxy-2-hydroxypropyl methacrylate, hydroxybutyl methacrylate, hydroxyhexyl methacrylate, hydroxyoctyl methacrylate and mixtures thereof. Preferably the hydroxyalkyl acrylate co-monomer of structural formula I is hydroxymethyl methacrylate, 2-hydroxyethyl methacrylate, 2-hydroxypropyl methacrylate, 3-hydroxypropyl methacrylate and mixtures thereof.

When mixtures of such co-monomers are selected, the mixtures may comprise 2-hydroxypropyl methacrylate and 3-hydroxy-propyl methacrylate (HPMA isomers), a blend in weight ratio, for example, in a range of from about 85/15 to about 60/40, respectively.

The hydroxy alkyl acrylamide co-monomer of structural formula II and/or III may be hydroxymethyl methacrylamide, 2-hydroxyethyl methacrylamide, 2-hydroxypropyl methacrylamide and 3-hydroxypropyl methacrylamide, 3-phenoxy-2-hydroxy-2-hydroxypropyl methacrylamide, hydroxybutyl methacrylamide, hydroxyhexyl methacrylamide, hydroxyoctyl methacrylamide and mixtures thereof.

The microstructure, namely the cis and trans structures, of the terpolymer are considered herein to be somewhat typical for an emulsion polymerization derived styrene/butadiene copolymer elastomer.

Preferably, the terpolymer elastomer is further characterized by a glass transition (Tg) in a range of about 0° C. to about −65° C., with a range of from about −50° C. to about −20° C. being particularly preferred.

The terpolymer may have a Mooney viscosity (M/L 1+4 at 100° C.) that varies. Suitable terpolymers have a Mooney viscosity as low as 20 to as high as 91. Preferably, the Mooney viscosity ranges from 50 to 90.

The aforesaid terpolymer elastomer can be synthesized, for example, by using conventional elastomer emulsion polymerization methods. For example, a charge composition comprised of water, one or more conjugated diolefin monomers, (e.g. 1,3-butadiene), one or more vinyl aromatic monomers (e.g. styrene) and the HPMA, a suitable polymerization initiator and emulsifier (soap). The terpolymerization may be conducted over a relatively wide temperature range such as for example, from about 4° C. to as high as 60°

C., although a temperature in a range of about 4° C. to about 10° C. may be more desirable.

The emulsifiers may be added at the onset of the polymerization or may be added incrementally, or proportionally as the reaction proceeds. Anionic, cationic or nonionic emulsifiers may be employed.

The second essential ingredient in the rubber compound is a rubber containing a nitrile moiety. This rubber will comprise from 10 to 90 phr of the total 100 parts by weight of rubber in the composition. Preferably, from 25 to 75 phr will be the rubber containing a nitrile moiety. The rubber may be derived from two or more polymerizable monomers. For example, the rubber is comprised of repeat units derived from (A) 30 to 89 weight percent of a conjugated diene monomer which contains from 4 to 8 carbon atoms;

(B) zero to 50 weight percent of a vinyl substituted aromatic monomer; and (C) 1 to 20 weight percent of a nitrile containing co-monomer.

Preferably, from 60 to 80 weight percent of the nitrile containing rubber is derived from the conjugated diene, from 20 to 40 weight percent is a derived vinyl substituted aromatic monomer and from 1 to 5 weight percent is derived from a nitrile containing co-monomer.

Representative examples of suitable conjugated diene monomers and vinyl substituted aromatic monomers which may be used to prepare the nitrile containing polymer include those used in preparation of the terpolymer with hydroxyl groups. Preferably, 1,3-butadiene and styrene are used, if any.

Representative examples of suitable olefinically unsaturated nitriles which may be used include acrylonitrile, methacrylonitrile, ethacrylonitrile, crotononitrile and mixtures thereof. Preferably, the olefinically unsaturated nitrile is acrylonitrile.

Preferably, the nitrile containing rubbers is characterized by a glass transition (Tg) in a range of about 0° C. to about −65° C., with a range of from −50° C. to −20° C. being particularly preferred.

The nitrile containing rubbers may have a Mooney viscosity (M/L 1+4 at 100° C.) that varies. Suitable examples of nitrile containing rubbers have a Mooney viscosity as low as 20 to as high as 91. Preferably, the Mooney viscosity ranges from 50 to 80.

The rubber having the nitrile moiety can be prepared by any of the known general techniques of polymerization, including free radical solution polymerization, emulsion or suspension polymerization techniques by batch, continuous or intermittent addition of the monomers and other components. The preferred method of preparation is an emulsion polymerization. The polymerization is preferably carried out in an aqueous medium in the presence of emulsifiers and a free-radical generating polymerization initiator at a temperature of from about 0° C. to 100° C., in a substantial absence of molecular oxygen. Preferably, the olefinically unsaturated nitrile is continuously or incrementally added to the reactor depending if the process is continuous or batch.

In the emulsion polymerization, other ingredients such as acids, electrolytes, chain transfer agents, chelating agents, and similar ingredients known in the art to be useful in emulsion polymerization may be employed in any of the feed streams.

A representative chelating agent useful in preparing the composition of the present invention is the tetrasodium salt of ethylenediaminetetracetic acid. Conventional amounts of the chelating agents may be used.

The electrolytes traditionally used in the latex industry may be used to prepare the composition of the present invention. Typical of these electrolytes are tetra sodium and potassium pyrophosphates, tri sodium and potassium phosphates, dipotassium and disodium hydrogen phosphates, potassium and ammonium carbonates, bicarbonates and sulfites. More specifically, tetra sodium and potassium pyrophosphates and tri sodium and potassium phosphates are preferred. The concentrations of the electrolytes are those minimum amounts necessary for achieving the desired effect.

Conventional modifiers or chain transfer agents may be used to prepare the elastomers of the present invention. Examples of these chain transfer agents include mercaptans, bromoform, carbon tetrabromide, and carbon tetrachloride. The most preferred are mercaptans. Examples of suitable mercaptans are n-octyl mercaptan, n-nonyl mercaptan, tertiary-nonyl mercaptan, n-decyl mercaptan, n-dodecyl mercaptan, sec-dodecyl mercaptan, tertiary-dodecyl mercaptan, tertiary-tetradecyl mercaptan, tertiary-hexadecyl mercaptan, secondary-hexadecyl mercaptan, n-hexadecyl mercaptan, or mixtures of mercaptans. It is possible to employ any of such modifiers, individually or in combination contingent to achieving desired polymer properties. With the monomers which are used to prepare the composition of the present invention, it is preferable that a modifier be present. Tertiary-dodecyl mercaptan is a preferred chain transfer agent. Chain transfer agents are conventionally used at a level of 0.05 to 0.8 phm (parts per one hundred parts of monomers). The chain transfer agent may be either premixed with the primary monomers or charged separately.

Suitable free radical polymerization initiators used to prepare the compositions of the present invention are those which are traditionally utilized in emulsion polymerization. Typical initiators or catalysts are persulfates, water soluble peroxides, and hydroperoxides. Typical examples of these initiators are ammonium, potassium and sodium persulfate, hydrogen peroxide, tertiary-butyl hydroperoxide, cumene hydroperoxide, para-menthane hydroperoxide, pinane hydroperoxide, and peroxy carbonates. Preferably, the hydroperoxides are used.

Other catalysts such as redox catalysts may be employed. One such redox system consists of ferrous sulfate heptahydrate, and sodium formaldehyde sulfoxylate. The advantages of the redox catalyst are well known in the art and usually allow lower polymerization temperatures. The initiators or catalysts are used in amounts sufficient to cause polymerization.

A listing of various emulsifiers and detergents which may be used to prepare the composition of the present invention is given in the book *McCutcheon's Emulsifiers and Detergents*, 1981 *Annuals*," which is incorporated herein by reference in its entirety. The emulsifiers useful in this invention may be a combination of one or more emulsifiers of the anionic, cationic, non-ionic, or amphoteric class of surfactants. Suitable anionic emulsifying agents are alkyl sulfonate, alkyl aryl sulfonates, condensed naphthalene sulfonates, alkyl sulfates, ethoxylated sulfates, phosphate esters, and esters of sulfosuccinic acid. Representative of these emulsifiers are sodium-alpha-olefin ($C_{14}$–$C_{16}$) sulfonates, alkali metal or ammonium dodecylbenzene sulfonates, disodium dodecyl diphenyloxide disulfonate, disodium palmityl diphenyloxide disulfonate, sodium, potassium or ammonium linear alkyl benzene sulfonate, sodium lauryl sulfate, ammonium alkyl phenolethoxylate sulfate, ammonium or sodium lauryl ether sulfate, ammonium alkyl ether sulfate, sodium alkyl ether sulfate, sodium dihexyl sulfosuccinate, sodium dicyclohexylsulfosuccinate, sodium diamyl sulfosuccinate, sodium diisobutyl-sulfosuccinate, disodium ethoxylated nonyl phenol half ester of sulfosuccinic acid, tetrasodium N-(1,2-dicarboxyethyl)-N-octadecyl sulfosuccinate, disodium bistridecyl sulfosuccinate, sodium salt of alkyl aryl polyether sulfate, lauryl alcohol ether sulfate, sodium salt of condensed naphthalene sulfonic acid, complex phosphate ester of ethylene oxide adduct and mixtures thereof Also, the sodium or potassium salts of rosin acid and sodium and potassium salts of mixed fatty acids and mixtures thereof may be used. The amount of emulsifying agents (surfactants) may vary. Conventionally, the concentration of the emulsifying system is normally in the range of from about 0.3 to 8.0 phm in the polymerization system.

In addition to the two dissimilar rubbers, the rubber or rubber component may contain one or more additional conjugated diene-based elastomers. When used, the additional rubber or rubbers generally range from 0 to 80 phr of the total rubber used. Preferably, the additional rubber will range from 10 to 50 phr with 90 to 50 phr being the total of the two dissimilar rubbers. More specifically, the additional rubbers range from 10 to 50 phr, the terpolymer ranges from 10 to 80 and the rubber containing nitrile may range from 10 to 80 phr.

Representative of various additional conjugated diene-based elastomers for use in this invention include, for example, cis 1,4-polyisoprene rubber (natural or synthetic), cis 1,4-polybutadiene, high vinyl polybutadiene having a vinyl 1,2 content in a range of about 30 to about 90 percent, styrene/butadiene copolymers (SBR) including emulsion polymerization prepared SBR and organic solvent polymerization prepared SBR, styrene/isoprene/butadiene terpolymers, isoprene/butadiene copolymers and isoprene/styrene copolymers.

Representative of rubber reinforcing carbon blacks for the tire tread rubber composition are those, for example, having an Iodine value (ASTM D1510) in a range of about 80 to about 160, alternatively about 100 to about 150, g/kg together with a DBP (dibutylphthalate) value (ASTM D2414) in a range of about 70 to about 200, alternatively about 100 to about 150 cm$^3$/100 g. Representative of such carbon blacks can easily be found in *The Vanderbilt Rubber Handbook*, 1978 edition, Page 417.

The term "phr" as used herein, and according to conventional practice, refers to "parts by weight of a respective material per 100 parts by weight of rubber, or elastomer."

In addition to the terpolymer rubber having pendant hydroxyl groups and rubber containing a nitrile moiety in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

$$Z\text{—Alk—}S_n\text{—Alk—}Z \qquad\qquad \text{IV}$$

in which Z is selected from the group consisting of

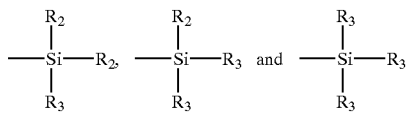

where $R_2$ is an alkyl group of 1 to 4 carbon atoms, cyclohexyl or phenyl; $R_3$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxydiethoxysilylethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysi lylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide. Therefore as to formula I, preferably Z is

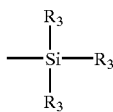

where $R_3$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula IV in a rubber composition will vary depending on the level of other additives that are used. Generally speaking, the amount of the compound of formula IV will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and terpolymer rubber having pendant hydroxyl groups and/or rubber containing a nitrile moiety are mixed in one or more non-productive mix stages. The terms "non-productive" and "productive" mix stages are well known to those having skill in the rubber mixing art. The two dissimilar rubbers may be added as a separate ingredient or in the form of a masterbatch. The rubber composition containing these two dissimilar rubbers, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber and these two dissimilar rubbers may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

EXAMPLE

Four rubber compounds were prepared to demonstrate the significance of the combination of a terpolymer rubber having pendant hydroxyl groups and a rubber containing a nitrile moiety versus use of one of such rubbers in combination with other emulsion rubbers. Samples A through C are considered Controls due to the absence of one or both of the required rubbers. Sample D is considered representative of the present invention.

The rubber compositions were prepared in an internal rubber mixer using three separate stages of addition (mixing), namely, two sequential non-productive mix stages (without the sulfur and accelerator curatives) to a temperature of about 160° C. and one final productive mix stage (with sulfur and accelerator curatives) to a temperature of about 115° C.

Materials used for this Example are illustrated in the following Table 1. The physical properties of the rubber samples are shown in Table 2.

TABLE 1

| First Non-Productive Mixing | Control Sample A | Control Sample B | Control Sample C | Sample D |
|---|---|---|---|---|
| Emulsion SBR Tg −20° C.[1] | 50 | 0 | 50 | 0 |
| Emulsion SBR Tg −45° C.[2] | 50 | 50 | 0 | 0 |
| Emulsion SBR-HPMA Tg −20° C.[3] | 0 | 50 | 0 | 50 |
| Emulsion SBR-ACN Tg −45° C.[4] | 0 | 0 | 50 | 50 |
| Precipitated silica[5] | 75 | 75 | 75 | 75 |
| Coupling agent[6] | 12 | 12 | 9 | 9 |
| Processing oil and waxes[7] | 21.5 | 21.5 | 21.5 | 21.5 |
| Stearic acid | 3 | 3 | 3 | 3 |
| Second Non-productive Mixing | | | | |
| Antidegradants[8] | 2.3 | 2.3 | 2.3 | 2.3 |
| Productive Mixing | | | | |
| Sulfur | 2 | 2 | 2 | 2 |
| Accelerator, sulfenamide and guanidine types | 3.2 | 3.2 | 3.2 | 3.2 |
| Zinc oxide | 2.5 | 2.5 | 2.5 | 2.5 |

[1]Styrene/butadiene copolymer elastomer, non-oil extended prepared by aqueous emulsion polymerization from The Goodyear Tire & Rubber Company with the following properties: Mooney ML/4 viscosity at 100° C. of about 62; styrene content of about 43 weight percent; glass transition temperature (Tg) of about −20° C. at a DSC (scanning calorimeter) mid-point
[2]Styrene/butadiene copolymer elastomer, non-oil extended, prepared by aqueous emulsion polymerization from The Goodyear Tire & Rubber Company with the following properties: Mooney ML/4 viscosity at 100° C. of about 64; styrene content of about 26 weight percent; glass transition temperature (Tg) of about −45° C. at a DSC (scanning calorimeter) mid-point
[3]Styrene/butadiene/HPMA copolymer elastomer, non-oil extended, prepared by aqueous emulsion polymerization from The Goodyear Tire & Rubber Company with the following properties: Mooney ML/4 viscosity at 100° C. of about 57; hydroxypropyl methacrylate (HPMA) of about three weight percent glass transition temperature (Tg) of about −20° C. at a DSC (scanning calorimeter) mid-point. The HPMA was a blend of a 2-hydroxypropyl methacrylate isomers in a weight ratio of about 80/20, respectively, as obtained from the Aldrich Chemical Company.
[4]Styrene/butadiene/ACN copolymer elastomer, non-oil extended, prepared by aqueous emulsion polymerization from The Goodyear Tire & Rubber Company with the following properties: Mooney ML/4 viscosity at 100° C. of about 60; acrylonitrile (ACN) of about three weight percent; glass transition temperature (Tg) of about −45° C. at a DSC (scanning calorimeter) mid-point
[5]Obtained as Zeosil 1165 MP from Rhodia S.A
[6]Composite of bis-(3-triethoxysilylproyl) disulfide (obtained as X266S from Degussa S.A.) and carbon black in a 50/50 weight ratio so that the disulfide material is 50 percent of the value reported in Table 1
[7]Aromatic rubber processing oil and microcrystalline and paraffinic waxes
[8]Phenylenediamine type

TABLE 2

|  | Control Sample A | Control Sample B | Control Sample C | Sample D |
|---|---|---|---|---|
| Mooney Plasticity (ML/4 100° C.) | 38.2 | 40 | 36.4 | 38.3 |
| Non-soluble polymer (percent)[1] | 35.7 | 50.7 | 34.7 | 51.2 |
| Rebound Zwick | | | | |
| 0° C. (percent) | 7 | 7.5 | 6.5 | 6.5 |
| 100° C. (percent) | 61 | 62.6 | 58.1 | 64.1 |
| Metravib at −10° C. and 1.5% strain | 0.89 | 0.85 | 0.92 | 0.92 |
| Tan delta | | | | |
| RPA at 100° C. and 10% strain | 0.124 | 0.11 | 0.13 | 0.105 |
| Tan delta | | | | |
| Shore A hardness at 23° C. | 71.8 | 71 | 71.3 | 69.6 |
| Tear resistance at 100° C. (N/mm) | 20.2 | 20.5 | 19.4 | 20.4 |
| Stress-strain at 23° C. (Zwick Ring assembly) | | | | |
| Tensile strength (MPa) | 20.7 | 20.1 | 19.4 | 20.4 |
| Elongation at break (%) | 490 | 470 | 410 | 420 |
| 100% modulus (MPa) | 2.5 | 2.7 | 2.5 | 2.5 |
| 300% modulus (MPa) | 12.7 | 15.1 | 12.4 | 14.7 |

[1]Determined by immersing the sample in tetrahydrofurane at 23° C. for 24 hours The unexpected results from the combination of E-SBR HPMA and E-SBR ACN can readily be seen in Table 2. In Sample B, the addition of E-SBR HPMA leads to a reduced heat generation based on an increased rebound 100° C. and a reduced tan delta at 100° C. This indicates a reduction in rolling resistance. The pronounced increase in modulus, 300 percent, and non-soluble polymer content indicate an increase in silica/polymer interaction in case of E-SBR HPMA. In Sample C, the addition of E-SBR ACN leads to an increased heat generation and no increase in modulus, 300 percent, and non-soluble polymer. While the observed effects of the individual addition of E-SBR HPMA and E-SBR ACN are as expected, the combination of both in Sample D leads to very beneficial property balance widely exceeding the expected average properties based on Samples B and C. The heat generation at 100° C. is reduced significantly below the E-SBR HPMA level. This is further combined with the benefits of a high non-soluble polymer content and 300 percent modulus, an increased tan delta at −10° C. (beneficial for wet braking) and no further reduction in tear resistance.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprising, based on 100 parts by weight (phr) of rubber, (A) from 10 to 90 phr of a terpolymer rubber comprised of repeat units derived from
  (1) 30 to 89 weight percent of a conjugated diene monomer which contains from 4 to 8 carbon atoms;
  (2) 10 to 50 weight percent of a vinyl substituted aromatic monomer; and
  (3) 1 to 20 weight percent of at least one co-monomer selected from the group consisting of the following general formulas I, II, and III:

I

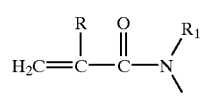
II

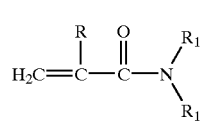
III wherein R represents a hydrogen atom or an alkyl group containing from 1 to 8 carbon atoms;

wherein $R_1$ represents a saturated alcohol group containing from 1 to 8 carbon atoms;

(B) from 10 to 90 phr of a rubber comprised of repeat units derived from
  (1) 30 to 99 weight percent of a conjugated diene monomer which contains from 4 to 8 carbon atoms;
  (2) zero to 50 weight percent of a vinyl substituted aromatic monomer; and
  (3) 1 to 20 weight percent of an olefinic unsaturated nitrile selected from the group consisting of acrylonitrile, methacrylonitrile, ethacrylonitrile, crotononitrile and mixtures thereof.

2. The rubber composition of claim 1 wherein said co-monomer is of formula I.

3. The rubber composition of claim 1 wherein said conjugated diene monomer is selected from the group consisting of 1,3-butadiene, isoprene, 1,3-ethylbutadiene, 1,3-pentadiene, 1,3-hexadiene, 1,3-cyclooctadiene, 1,3-octadiene and mixtures thereof.

4. The rubber composition of claim 1 wherein said vinyl substituted aromatic monomer is selected from the group consisting of styrene, alpha methyl styrene, vinyl toluene, 3-methyl styrene, 4-methyl styrene, 1-cyclohexylstyrene, 4-para-tolylstyrene, para-chlorostyrene, 4-tert-butyl styrene, 1-vinylnapthalene, 2-vinylnaphthalene and mixtures thereof.

5. The rubber composition of claim 1 wherein the Tg of the terpolymer elastomer ranges from 0° C. to −65° C.

6. The rubber composition of claim 1 wherein R is selected from the group consisting of a hydrogen atom and alkyl groups having from 1 to 4 carbon atoms.

7. The rubber composition of claim 1 wherein $R_1$ is selected from the group consisting of a saturated alcohol group containing from 1 to 4 carbon atoms.

8. The rubber composition of claim 1 wherein said rubber composition comprises
   (A) from 25 to 75 phr of a terpolymer rubber comprised of repeat units derived from
      (1) 50 to 80 weight percent of 1,3-butadiene;
      (2) 20 to 40 weight percent of styrene; and
      (3) 1 to 5 weight percent of a co-monomer selected from hydroxymethyl methacrylate, 2-hydroxyethyl methacrylate, 2-hydroxypropyl methacrylate, 3-hydroxypropyl methacrylate, 3-phenoxy-2-hydroxypropyl methacrylate, hydroxybutyl methacrylate, hydroxyhexyl methacrylate and hydroxyoctyl methacrylate;
   (B) from 25 to 75 phr of a rubber comprised of repeat units derived from
      (1) 60 to 80 weight percent of 1,3-butadiene;
      (2) 20 to 40 weight percent of a styrene aromatic monomer; and
      (3) 1 to 5 weight percent of a acrylonitrile.

9. The rubber composition of claim 1 wherein
   (A) from 10 to 90 phr is said terpolymer;
   (B) from 10 to 90 phr is said rubber compound of repeat units derived from a conjugated diene monomer, vinyl substituted aromatic monomer and olefinic unsaturated nitrile; and
   (C) from zero to 80 phr of at least one additional rubber selected from the group consisting of cis 1,4-polyisoprene rubber, cis 1,4-polybutadiene, high vinyl polybutadiene, styrene/butadiene copolymers, styrene/isoprene/butadiene terpolymers, 3,4-polyisoprene, isoprene/butadiene copolymers and isoprene/styrene copolymers.

10. The rubber composition of claim 9 wherein said additional rubber ranges from 10 to 50 phr.

11. A tire having a rubber containing component comprising, based on 100 parts by weight (phr) of rubber
   (A) from 10 to 90 phr of a terpolymer rubber comprised of repeat units derived from
      (1) 30 to 89 weight percent of a conjugated diene monomer which contains from 4 to 8 carbon atoms;
      (2) 10 to 50 weight percent of a vinyl substituted aromatic monomer; and
      (3) 1 to 20 weight percent of at least one of co-monomer selected from the group consisting the following general formulas I, II, and III:

$$H_2C=\overset{R}{\underset{|}{C}}-\overset{O}{\underset{\|}{C}}-O-R_1 \quad \text{I}$$

$$H_2C=\overset{R}{\underset{|}{C}}-\overset{O}{\underset{\|}{C}}-N\overset{R_1}{\underset{R}{\diagdown}} \quad \text{II}$$

$$H_2C=\overset{R}{\underset{|}{C}}-\overset{O}{\underset{\|}{C}}-N\overset{R_1}{\underset{R_1}{\diagdown}} \quad \text{III}$$

wherein R represents a hydrogen atom or an alkyl group containing from 1 to 8 carbon atoms;
wherein $R_1$ represents a saturated alcohol group containing from 1 to 8 carbon atoms;

(B) from 10 to 90 phr of a rubber comprised of repeat units derived from
      (1) 30 to 99 weight percent of a conjugated diene monomer which contains from 4 to 8 carbon atoms;
      (2) zero to 50 weight percent of a vinyl substituted aromatic monomer; and
      (3) 1 to 20 weight percent of an olefinic unsaturated nitrile selected from the group consisting of acrylonitrile, methacrylonitrile, ethacrylonitrile, crotononitrile and mixtures thereof.

12. The tire of claim 11 wherein said co-monomer is of formula I.

13. The tire of claim 11 wherein said conjugated diene monomer is selected from the group consisting of 1,3-butadiene, isoprene, 1,3-ethylbutadiene, 1,3-pentadiene, 1,3-hexadiene, 1,3-cyclooctadiene, 1,3-octadiene and mixtures thereof.

14. The tire of claim 11 wherein said vinyl substituted aromatic monomer is selected from the group consisting of styrene, alpha methyl styrene, vinyl toluene, 3-methyl styrene, 4-methyl styrene, 1-cyclohexylstyrene, 4-paratolylstyrene, para-chlorostyrene, 4-tert-butyl styrene, 1-vinylnapthalene, 2-vinylnaphthalene and mixtures thereof.

15. The tire of claim 11 wherein the Tg of the terpolymer elastomer ranges from 0° C. to −65° C.

16. The tire of claim 11 wherein R is selected from the group consisting of a hydrogen atom and alkyl groups having from 1 to 4 carbon atoms.

17. The tire of claim 11 wherein $R_1$ is selected from the group consisting of a saturated alcohol group containing from 1 to 4 carbon atoms.

18. The tire of claim 11 wherein said rubber composition comprises
   (A) from 25 to 75 phr of a terpolymer rubber comprised of repeat units derived from
      (1) 50 to 80 weight percent of 1,3-butadiene;
      (2) 20 to 40 weight percent of styrene; and
      (3) 1 to 5 weight percent of a co-monomer selected from hydroxymethyl methacrylate, 2-hydroxyethyl methacrylate, 2-hydroxypropyl methacrylate, 3-hydroxypropyl methacrylate, 3-phenoxy-2-hydroxypropyl methacrylate, hydroxybutyl methacrylate, hydroxyhexyl methacrylate and hydroxyoctyl methacrylate;
   (B) from 25 to 75 phr of a rubber comprised of repeat units derived from
      (1) 60 to about 80 weight percent of 1,3-butadiene;
      (2) 20 to 40 weight percent of a styrene; and
      (3) 1 to 5 weight percent of a acrylonitrile.

19. The tire of claim 11 wherein
   (A) from 10 to 90 phr is said terpolymer;
   (B) from 10 to 90 phr is said rubber compound of repeat units derived from a conjugated diene monomer, vinyl substituted aromatic monomer and olefinic unsaturated nitrile; and
   (C) from zero to 80 phr of at least one additional rubber selected from the group consisting of cis 1,4-polyisoprene rubber, cis 1,4-polybutadiene, high vinyl polybutadiene, styrene/butadiene copolymers, styrene/isoprene/butadiene terpolymers, 3,4-polyisoprene, isoprene/butadiene copolymers and isoprene/styrene copolymers.

20. The tire of claim 19 wherein said additional rubber ranges from 10 to 50 phr.

* * * * *